(12) United States Patent
Fukushima

(10) Patent No.: US 10,469,674 B1
(45) Date of Patent: Nov. 5, 2019

(54) IMAGE FORMING APPARATUS, IMAGE FORMING SYSTEM, AND COMMUNICATION PROCESSING METHOD WITH DRAWING MODE DRAWING IN SELF-APPARATUS AT TIME OF REMOTE MAINTENANCE CONNECTION

(71) Applicant: KYOCERA Document Solutions Inc., Osaka (JP)

(72) Inventor: Keisuke Fukushima, Concord, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/993,810

(22) Filed: May 31, 2018

(51) Int. Cl.
*G06F 3/12* (2006.01)
*H04N 1/00* (2006.01)
*G06F 3/01* (2006.01)

(52) U.S. Cl.
CPC ......... *H04N 1/00233* (2013.01); *G06F 3/017* (2013.01); *H04N 1/00167* (2013.01); *H04N 1/00177* (2013.01); *H04N 1/00188* (2013.01); *H04N 1/00411* (2013.01); *H04N 1/00588* (2013.01)

(58) Field of Classification Search
None
See application file for complete search history.

(56) References Cited

U.S. PATENT DOCUMENTS

| 2009/0059287 | A1* | 3/2009 | Yamada | H04N 1/00222 358/1.15 |
| 2017/0264760 | A1* | 9/2017 | Sato | H04N 1/00061 |
| 2017/0374211 | A1* | 12/2017 | Saito | G06F 3/1286 |

FOREIGN PATENT DOCUMENTS

JP 2007-115039 A 5/2007

* cited by examiner

*Primary Examiner* — Henok Shiferaw
(74) *Attorney, Agent, or Firm* — Hawaii Patent Services; Nathaniel K. Fedde; Kenton N. Fedde

(57) ABSTRACT

Provided is an image forming apparatus having a drawing mode that enables drawing on a terminal at time of remote maintenance connection. A connecting part connects with the terminal for remote maintenance in a session of a specific protocol. An operation acquiring part acquires operational information corresponding to operation of the terminal connected by the connecting part. A drawing mode switching part switches to the drawing mode that performs drawing on a display of an operation panel part by using the operational information acquired by the operation acquiring part. A drawing part draw to the operation panel part corresponding to a drawing instruction included in the operational information and to reflect a drawing result on the terminal when being switched to the drawing mode by the drawing mode switching part.

6 Claims, 7 Drawing Sheets

IMAGE FORMING APPARATUS, IMAGE FORMING SYSTEM, AND COMMUNICATION PROCESSING METHOD WITH DRAWING MODE DRAWING IN SELF-APPARATUS AT TIME OF REMOTE MAINTENANCE CONNECTION

BACKGROUND

The present disclosure relates to an image forming apparatus, an image forming system, and a communication processing method, especially is associated with the image forming apparatus, the image forming system, and the communication processing method, which enables remote maintenance.

An image forming apparatus, such as an MFP (Multi-Functional Peripheral), is used to print a document and an image.

Here, as typical technology, an image forming apparatus that performs a different remote panel display between a main part and an outside by using the same VRAM is disclosed. The image forming apparatus is provided with a display screen data generating part that generates the display screen data as an operation panel. Also, the image forming apparatus is provided with an operation part that displays display screen data and instructions about operation are inputted. Also, the image forming apparatus is provided with a remote-control processing part that transmits the display screen data to an external information terminal, receives instructions of an operation from the external information terminal, and processes remote control. Also, the image forming apparatus is provided with a control part that controls each part based on the instructions inputted on the operation part or the external information terminal. Also, display screen data generating part generates so as to be displayed as including an area where display screen data differs, display screen data between the operation part and the display part of the external information terminal.

SUMMARY

An image forming apparatus of the present disclosure is an image forming apparatus includes a connecting part configured to connect with a terminal for remote maintenance in a session of a specific protocol; an operation acquiring part configured to acquire operational information corresponding to operation of the terminal connected by the connecting part; a drawing mode switching part configured to switch to a drawing mode that performs drawing on a display of an operation panel part by operational information acquired by the operation acquiring part; a drawing part configured to draw to the operation panel part corresponding to a drawing instruction included in the operational information and to reflect a drawing result on the terminal when being switched to the drawing mode by the drawing mode switching part.

An image forming system of the present disclosure is an image forming system having an image forming apparatus and a terminal for remote maintenance of the image forming apparatus, wherein:

the image forming apparatus includes a connecting part configured to connects with the terminal in a session of a specific protocol; an operation acquiring part configured to acquire operational information corresponding to operation of the terminal connected by the connecting part, a drawing mode switching part configured to switch to a drawing mode that performs drawing on a display of an operation panel part by operational information acquired by the operation acquiring part, and a drawing part configured to draw to the operation panel part corresponding to a drawing instruction included in the operational information and to reflect a drawing result on the terminal when being switched to the drawing mode by the drawing mode switching part; and the terminal includes a display part configured to display an emulated image emulated on the operation panel part of the image forming apparatus, and an operation transmitting part configured to transmit the operational information including pointer data about movement and depression of a pointer on the emulated image and/or key data about depression of a key in the terminal to the image forming apparatus in the session.

A communication processing method of the present disclosure is a communication processing method executed by an image forming apparatus capable of communicating with a terminal for remote maintenance, comprising the steps of: connecting with the terminal in a session of a specific protocol; acquiring operational information corresponding to operation of the connected terminal; switching to a drawing mode that performs drawing on display of an operation panel part by the acquired operational information; drawing to the operation panel part corresponding to a drawing instruction included in the operational information; and being reflect a drawing result on the terminal when being switched to the drawing mode.

SPECIFICATION

Embodiment

Figure 1:
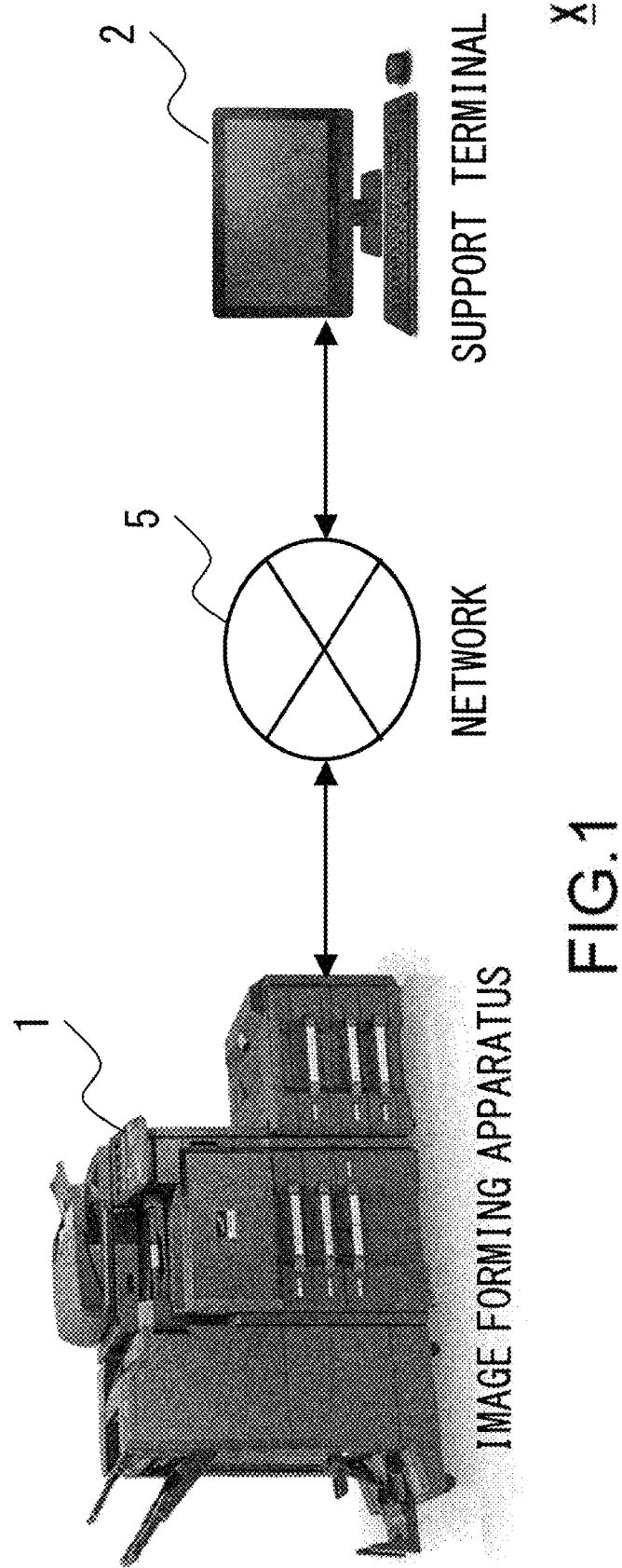
FIG. 1 is a system configuration figure of the image forming system according to an embodiment of the present disclosure.
Figure 2:
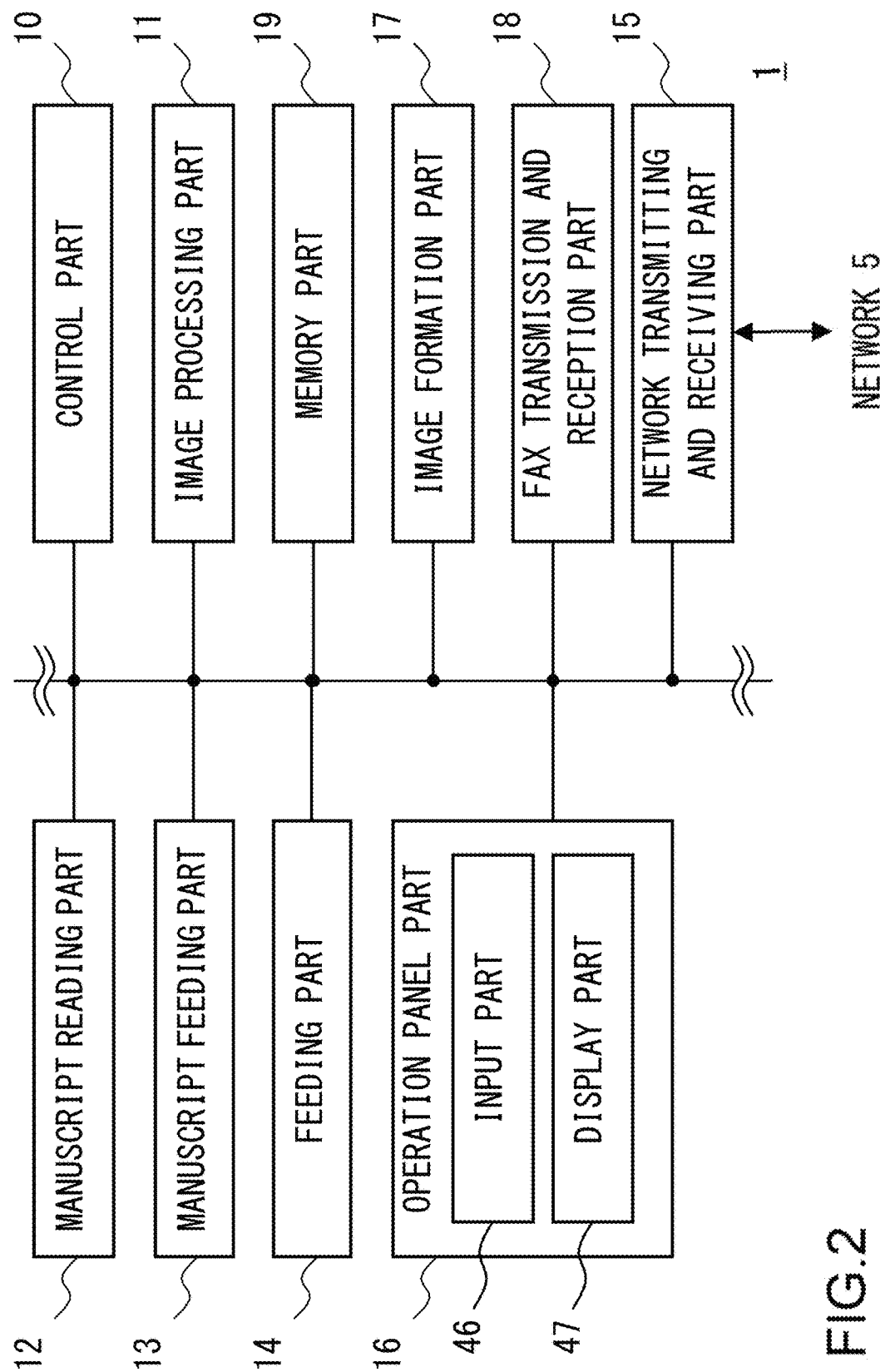
FIG. 2 is a block diagram showing a control configuration of the image forming apparatus as shown in FIG. 1.
Figure 3:
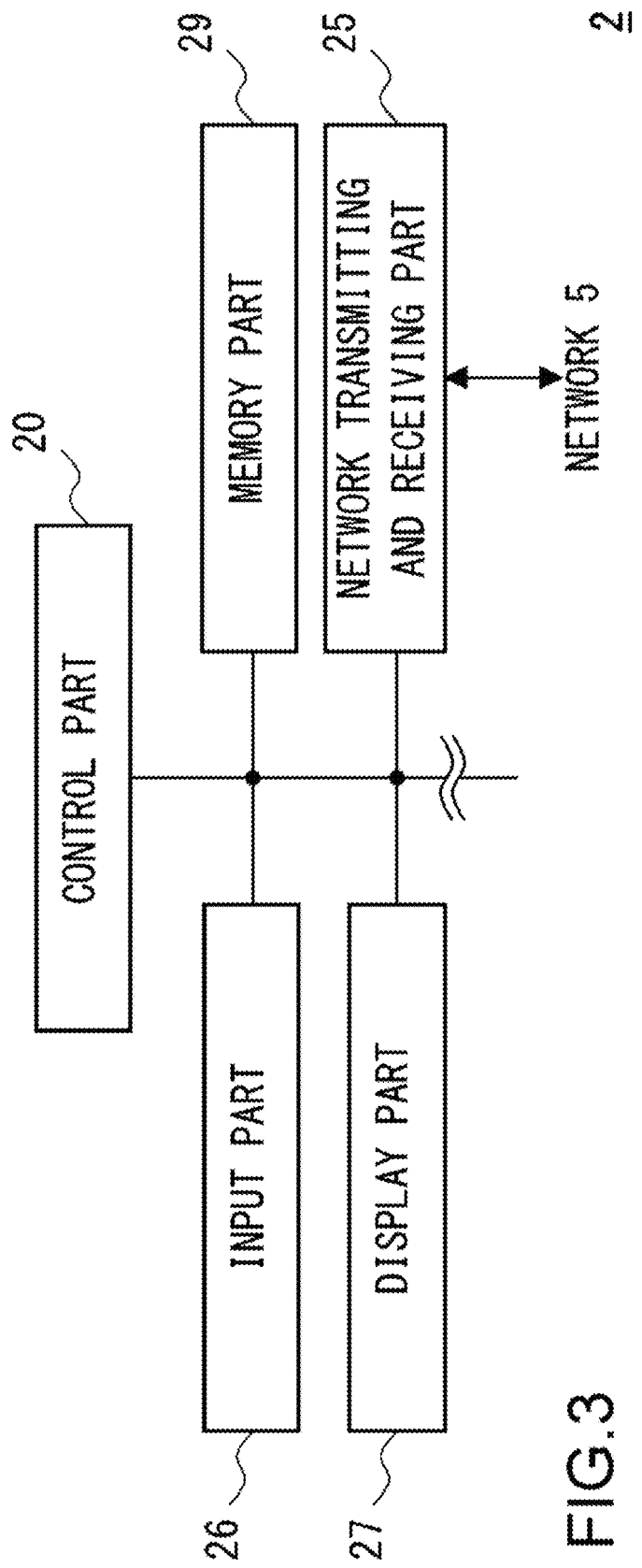
FIG. 3 is a block diagram showing a control configuration of the support terminal as shown in FIG. 1.

[System Configuration of Image Forming System X] Firstly, as refer to FIG. 1-FIG. 3, the system configuration of image forming system X according to the embodiment of the present disclosure is explained.

According to FIG. 1, image forming system X according to the embodiment of the present disclosure includes image forming apparatus 1 and support terminal 2 for remote maintenance of image forming apparatus 1. Also, each apparatus is connected with network 5.

Image forming apparatus 1 is information processing apparatus, such as an MFP, a network scanner, a document scanner, network FAX, a printer, or the like. Also, image forming apparatus 1 can perform copying a document, printing, scanning, transmitting facsimile, or the like.

Also, in image forming apparatus 1 in the present embodiment, remote maintenance between remote places via network 5 is available. In service of the remote maintenance, an IT administrator, or the like, who is a customer, is in the side of image forming apparatus 1, and he or she perform maintenance by receiving instructions from a support personnel.

Support terminal 2 is PC, a mobile phone, a smart phone, PDA (Personal Data Assistant), a business-use support terminal, a dedicated terminal, or the like. Also, in support terminal 2, a kind of general-purpose OS (Operating System), or the like, is executed. Also, support terminal 2 can install a various application software (henceforth, an "application").

Also, support terminal 2 is a terminal for remote maintenance. The support personnel of the remote maintenance service as mentioned above use support terminal 2 and instructs to the IT administrator, or the like, for image forming apparatus 1. In this case, support terminal 2 displays a screen just emulated operation panel part 16 (FIG. 2) in image forming apparatus 1 and indicates various instructions on the screen. The contents of instructions by the support personnel via the screen are reflected on display part 47, or the like, in image forming apparatus 1. Also, image forming apparatus 1 is controlled corresponding to the button on the screen.

That is, in the present embodiment, the support may be performed with one to one communication by using function as a remote desktop function provided in an OS of a common PC. Therefore, for example, a RFB server, or the like is executed in image forming apparatus 1, and an RFB client is executed in support terminal 2. Also, support terminal 2 may execute the RFB client by using Java script (R), or the like. In this case, the image emulated operation panel part 16 can be displayed on support terminal 2, and image forming apparatus 1 can be controlled based on the displayed image. That is, support terminal 2 displays the emulated screen as a "remote panel" by using a web browser, and it can control image forming apparatus 1. In detail, it is possible to use functions, such as a print, a scan, FAX transmission and reception, and network FAX, in image forming apparatus 1 with instructions by the support personnel from support terminal 2. By using these functions, it becomes possible to check and to show solution of a problem situation for a customer's image forming apparatus 1 from a remote environment.

Network 5 is, in the present embodiment, LAN (Local Area Network), such as intranet, or the like, or WAN (Wide Area Network), such as the Internet, a mobile phone network, or the like. In case that network 5 is WAN, it connects with other servers via a router, a gateway, or the like. Also, network 5 may configure VPN (Virtual Private Network).

In addition, in image forming system X, it may include a plurality of image forming apparatuses 1 and support terminals 2, respectively.

(Configuration of Image Forming Apparatus 1)

Then, as refer to FIG. 2, a configuration of image forming apparatus 1 according to the embodiment of the present disclosure is explained. Image forming apparatus 1 may include image processing part 11, manuscript reading part 12, manuscript feeding part 13, feeding part 14, network transmitting and receiving part 15, operation panel part 16, image formation part 17 (image forming unit), FAX transmission and reception part 18, memory part 19, or the like. Each part is connected to control part 10, and these operations are controlled by control part 10.

Control part 10 is an information processing part, such as GPP (General Purpose Processor), CPU (Central Processing Unit), MPU (Micro Processing Unit), DSP (Digital Signal Processor), GPU (Graphics Processing Unit), ASIC (Application Specific Processor), or the like. Control part 10 reads the control program stored in ROM or HDD of memory part 19, expands to RAM, executes the control program, and is operated as each part of a functional block as described later. Also, control part 10 controls a whole device corresponding to specified instructions information inputted from support terminal 2 or operation panel part 16.

Image processing part 11 is a control arithmetic unit, such as DSP (Digital Signal Processor) or GPU (Graphics Processing Unit), or the like. Image processing part 11 performs specified image processing for image data. For example, the specified image processing may be a process of scaling, concentration tuning, tone adjustment, an image improvement, or the like. Also, image processing part 11 stores the image read by manuscript reading part 12 as print data in memory part 19. In this case, image processing part 11 can also convert print data into an electronic filing documents, such as PDF, or the like, or a file of an image data, such as TIFF, or the like. Also, image processing part 11 may be able to execute at least a part of a process of OCR (Optical Character Recognition).

Manuscript reading part 12 reads a set manuscript. Manuscript reading part 12 is arranged on the upper part of the body part of image forming apparatus 1. Manuscript reading part 12 is provided with a scanner, platen glass, and a manuscript reading slit. Manuscript reading part 12 moves the scanner to the position that faces the platen glass when reading the manuscript placed on the platen glass. Manuscript reading part 12 is read the manuscript placed on the platen glass with scanning and acquires image data. Manuscript reading part 12 outputs the acquired image data to control part 10.

Also, manuscript reading part 12 moves the scanner to the position which faces a manuscript reading slit when reading the manuscript fed from manuscript feeding part 13. Then, via the manuscript reading slit, manuscript reading part 12 reads the manuscript synchronizing with conveyance operation of the manuscript by manuscript feeding part 13, and it acquires image data. Manuscript reading part 12 outputs the acquired image data to control part 10.

Manuscript feeding part 13 conveys the manuscript read by manuscript reading part 12. Manuscript feeding part 13 is arranged on the upper part of manuscript reading part 12. Manuscript feeding part 13 is provided with a manuscript mounting part and a manuscript transport mechanism.

Manuscript feeding part 13 feeds out the manuscript placed on the manuscript mounting part one sheet at a time by using the manuscript transport mechanism, and it feeds to manuscript reading part 12.

Feeding part 14 feeds out a recording paper one sheet at a time to image formation part 17. Feeding part 14 is provided in the body part.

Network transmitting and receiving part 15 is a network connection part including a LAN board, a wireless transceiver, or the like, for connecting with external networks, such as LAN, wireless LAN, WAN, the mobile phone network, or the like. Network transmitting and receiving part 15 transmits and receives data by using a line for data communications, and transmits and receives an audio signal by using a voice call line.

Operation panel part 16 is arranged in front-side of image forming apparatus 1. Also, operation panel part 16 includes input part 46 and display part 47.

Input part 46 is an input unit of a touch panel, physical buttons, or the like, which acquires the instructions by IT administrator, or the like, to image forming apparatus 1.

Input part 46 may include buttons, such as a start, a stop, a reset, a copy, a transmission, and a FAX, or the like, to instruct for calling various functions. Also, input part 46 may include a physical numeric keypad, a "#Keys" button for displaying a numeric keypad on display part 47, a "home" button for returning to the "home" screen that is the first screen, or the like. Also, input part 46 may include various buttons, such as an "Interrupt" of a job, an "Authentication/Logout," an "Energy saver," or the like. Also, input part 46 may include buttons for making a various state of performing an instruction about the job change, such as an "Accessibility Display," a "Status/Job cancel," a "System Menu/Counter," or the like. Also, the job to be instructed may be types, such as printing, transmitting, storing, and recording for a selected document.

In addition, it is also possible to input and change each user's information with a user's instructions acquired from input part 46. Also, input part 46 can connect a reader for a magnetic card or an IC card, a device for biometric authentication, or the like.

Display part 47 includes a display panel, such as LCD (Liquid Crystal Display), an organic EL display, and an indicator, such as LED (Light Emitting Diode), or the like. The display panel of display part 47 can display a various operation screens of GUI (Graphical User Interface). In the present embodiment, input part 46 and display part 47 may be combined and configured as like a display having a touch panel. Therefore, it is also possible to arrange buttons for various operations on display part 47 and is instructed via input part 46 by depressing them. Also, as above-mentioned, it is possible to display a numeric keypad on display part 47. Also, LED of display part 47 can display various states. Also, LED can display the various states of the self-apparatus. Also, some of LED, or the like, for display part 47 may be provided inside of the button. Thereby, it can inspect a state of depression of the button, or the like.

Also, operation panel part 16 may be provided with a connecting part that connects with an external record medium, such as flash memory card, a USB storage apparatus, or the like.

Image formation part 17 makes the image formation from the data stored in memory part 19, read by manuscript reading part 12, or acquired from the external support terminal by a user's output instruction to a recording paper perform. Image formation part 17 is provided with a photo conductor drum, an exposure part, a developing part, a transfer part, a fixing part, or the like. Image formation part 17 records a toner image on a recording paper by performing an image formation process of electrification, exposure, development, transfer, and fixing.

FAX transmission and reception part 18 transmits and receives a facsimile. FAX transmission and reception part 18 can perform facsimile receiving from other FAX equipment via a voice line, can preserve it on memory part 19, and can perform image formation by image formation part 17. Also, FAX transmission and reception part 18 converts the manuscript read by manuscript reading part 12, the data of network FAX transmitted from the external support terminal into image data. FAX transmission and reception part 18 can perform facsimile transmission of the image data to other FAX equipment via a voice line.

Memory part 19 is a memory part having a non-transitory recording medium. Memory part 19 may include, for example, semiconductor memory, such as ROM (Read Only Memory), RAM (Random Access Memory), or the like, or HDD (Hard Disk Drive), or the like. RAM of memory part 19 may be held a memory content in a power-saving state by self refreshing function, or the like. The control program for operation-controlling image forming apparatus 1 is stored in ROM or HDD of memory part 19. The control program may be an OS and various applications. In addition, memory part 19 may also store user account settings. Also, an area of a storage folder (Document box) for each user may be included in memory part 19.

In addition, image forming apparatus 1, control part 10 and image processing part 11 may be integrally-formed as like CPU with built-in GPU, a chip-on module package, SOC (System On Chip), or the like. Also, control part 10 and image processing part 11 may contain RAM, ROM, a flash memory, or the like.

(Configuration of Support Terminal 2)

Also, according to FIG. 3, support terminal 2 is provided with control part 20, network transmitting and receiving part 25, input part 26, display part 27, memory part 29, or the like. Control part 20 may be an information processing part, such as GPP (General Purpose Processor), CPU (Central Processing Unit), MPU (Micro Processing Unit), DSP (Digital Signal Processor), GPU (Graphics Processing Unit), ASIC (Application Specific Processor, processor for particular applications), or the like.

Input part 26 is a keyboard, various sensors, a pointing device, or the like, for acquiring the various instructions by a user. The pointing device includes a touch panel, a digitizer, a touchpad, or the like. Input part 26 can make various instructions input by a user, such as the support personnel, or the like, by using GUI (Graphical User Interface) of OS and can acquire this. Also, information of moving the pointer and depressing a key (physical key) of the keyboard in input part 26 is transmitted to image forming apparatus 1. That is, the display of display part 27 explained below is updated based on this information.

Display part 27 includes a flat-panel screen panel, such as LCD, an organic EL display, a FED (Field Emission Display), a fluorescent character display tube, or the like, a projector, LED for a status display, or the like. Display part 27 can display various operation screens according with GUI. In addition, input part 26 and display part 27 may be integrally-formed as like a display with the touch panel or the digitizer.

Network transmitting and receiving part 25 is a network connection part including a LAN board, a wireless transceiver, or the like, for connecting with network 5.

Memory part 29 is a memory part having a non-transitory recording medium. Memory part 29, for example, may include various RAM as a main memory part. Also, memory part 29, for example, may include ROM, eMMC (embedded Multi Media Card), SSD (Solid State Drive), HDD, or the like as an auxiliary memory part. Also, memory part 29 stores a control program for the self-apparatus. The control program may be various OS, a web browser that can browse webs, such as WWW, or the like, various applications, or the like. Also, memory part 29 may include external storages, such as various flash memories, optical recording media, or the like.

[Functional Configuration of Image Forming System X]

Figure 4:
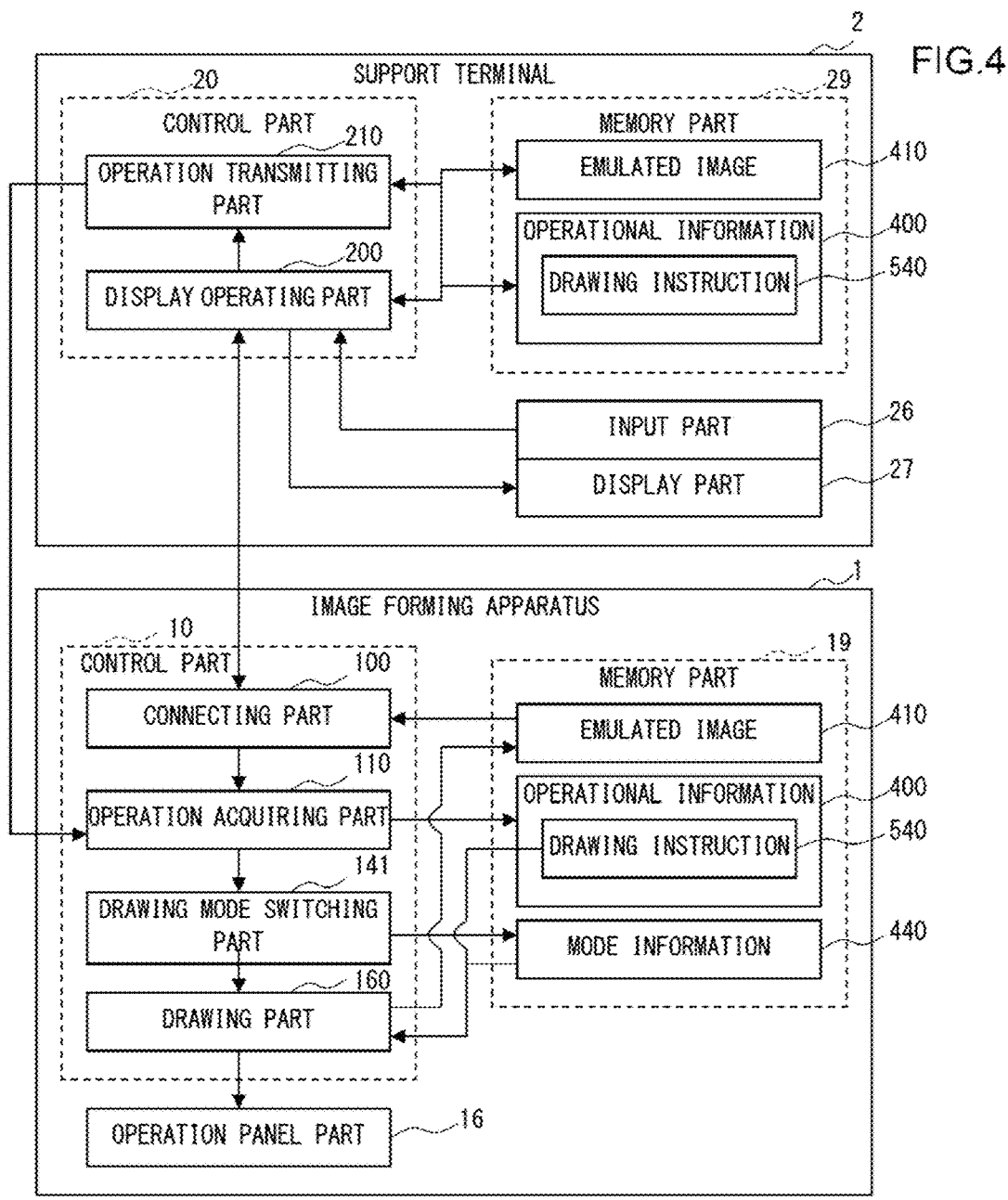
FIG. 4 is a block diagram showing a functional configuration of the image forming system according to the embodiment of the present disclosure.

Here, as refer to FIG. 4, a functional configuration of image forming system X in the present embodiment is explained. Control part 10 in image forming apparatus 1 is provided with connecting part 100, operation acquiring part 110, drawing mode switching part 141, and drawing part 160. Memory part 19 in image forming apparatus 1 stores operational information 400, emulated image 410, and mode information 440. Control part 20 in support terminal 2 is provided with display operating part 200 and operation transmitting part 210. Memory part 29 in support terminal 2 stores operational information 400 and emulated image 410.

Connecting part 100 connects with support terminal 2 in a session of a specific protocol. The specific protocol may be a protocol extended from the RFB protocol. In this case, connecting part 100 may execute a program compatible with the RFB server. Also, connecting part 100 can transmit emulated image 410 to support terminal 2 according to the instructions from operation acquiring part 110. The transmission may be executed as corresponded to the RFB protocol.

Operation acquiring part 110 acquires operational information 400 corresponding to operation of support terminal 2 connected by connecting part 100. Also, operation acquiring part 110 interprets operational information 400, updates display part 47 of operation panel part 16, and generates and updates emulated image 410 corresponding to this. In this case, operation acquiring part 110 may generate and update emulated image 410 based on states of a display panel, LED, or the like, in display part 47.

Drawing mode switching part 141 switches to a drawing mode by operational information 400 acquired by operation acquiring part 110. The drawing mode is a mode that performs drawing on the display of operation panel part 16. That is, in the drawing mode, the contents, which the support personnel have drawn on the remote panel in support terminal 2, are drawn on the display panel of display part 47 in operation panel part 16. Drawing mode switching part 141 sets this change as mode information 440. In addition, a mode that operates normal remote panels other than the drawing mode is called as a "normal control mode" in the following. In detail, drawing mode switching part 141 analyzes operational information 400. Then, drawing mode switching part 141 changes the mode when the area of the image for the mode change button is depressed with the pointer. Drawing mode switching part 141 may determine the area of the image for the mode change button by coordinates of the pointer. Also, drawing mode switching part 141 may change the mode when a specific key of support terminal 2 is depressed. This "specific key" may be arbitrarily set up, for example, "D", "P", "space", "ESC", "Scroll Lock" key, or the like, by the developer of the remote panel. That is, the drawing mode and the normal control mode can be changed (switched) by an instruction by the support personnel.

Drawing part 160 draws to operation panel part 16 corresponding to drawing instruction 540 included in operational information 400 when being switched to the drawing mode by drawing mode switching part 141. Also, drawing part 160 reflects a drawing result to support terminal 2. In detail, drawing part 160 performs input of a character, drawing of an annotation picture, or drawing of a highlight in the drawing mode. In these, the input of a character may be a drawing based on an input by handwritten character recognition, a virtual keyboard input, or the like. Also, the drawing of an annotation picture may be an annotation directly-written to emulated image 410. That is, it may draw with drawing instruction 540, directly. Also, the drawing of the highlight may be drawn as a character and a mark of an area in drawing instruction 540 is filled, semi-transparently, by the support personnel as like a "highlighter pen."

Display operating part 200 connects with connecting part 100 in image forming apparatus 1. In the present embodiment, display operating part 200 may connect with connecting part 100 with the protocol extended from the RFB protocol. In this case, display operating part 200 may execute the "remote panel," which is a program compatible with the RFB client for image forming apparatus 1. Also, display operating part 200 acquires emulated image 410 from above-mentioned connecting part 100 in image forming apparatus 1 and displays it on display part 27. Also, display operating part 200 may execute the remote panel on the web browser in support terminal 2 by using Java script (R), or the like. The program compatible with the RFB client is acquired by connecting with the web server in image forming apparatus 1 or, otherwise, it may be acquired by accessing a web site of a server for a support. Thereby, without prior-installation the dedicated application, and it becomes possible to use the remote panel.

Also, in the present embodiment, display operating part 200 can move the pointer in all areas of emulated image 410 displayed on the web browser in support terminal 2. The areas may include areas other than the area for image of the display panel, which is actually-displayed on display part 47 in operation panel part 16 in image forming apparatus 1. In the present embodiment, as described later, an image of the mode change button is included in an area other than the display panel.

Operation transmitting part 210 acquires various instructions of the support personnel on the remote panel and transmits them to image forming apparatus 1. In detail, in the present embodiment, operation transmitting part 210 acquires pointer data about movement and depression of the pointer in emulated image 410 rendered on display part 27. Further, operation transmitting part 210 transmits the pointer data as operational information 400 to image forming apparatus 1 in the session. Also, operation transmitting part 210 can acquire the pointer data having for an area of the physical buttons of operation panel part 16 on emulated image 410.

Also, operation transmitting part 210 can also acquire pointer data on the area for the image of the mode change button in emulated image 410 as operational information 400.

Also, operation transmitting part 210 may send key data about depression of a key in support terminal 2 as operational information 400.

Also, in the present embodiment, display part 27 displays emulated image 410.

Operational information 400 includes the pointer data about movement and depression of the pointer on emulated image 410. In detail, operational information 400 may include information on depression of a button as the pointer data. About this, operational information 400 may include the pointer data in the area of the image for the mode change button, which changes (switches) the mode, or the like. Also, operational information 400 may include the key data about depression of the key in support terminal 2. That is, operational information 400 may include information of depression of a physical key in input part 26.

Also, operational information 400 includes drawing instruction 540. Drawing instruction 540 may be an instruction about the input of a character, the drawing of an annotation picture, or the drawing of a highlight by the support personnel corresponding to the pointer data and/or the key data. That is, drawing instruction 540 may include data of a character string, an annotation picture, or coordinate data of a highlight with each command (instruction), or the like.

Mode information 440 is information including a flag, or the like, which indicates a state in the present mode. That is, mode information 440 may be set up as the value of "1" in the drawing mode and "0" in the normal control mode, or the like.

(Screen Example of Emulated Image 410)

Figure 5:
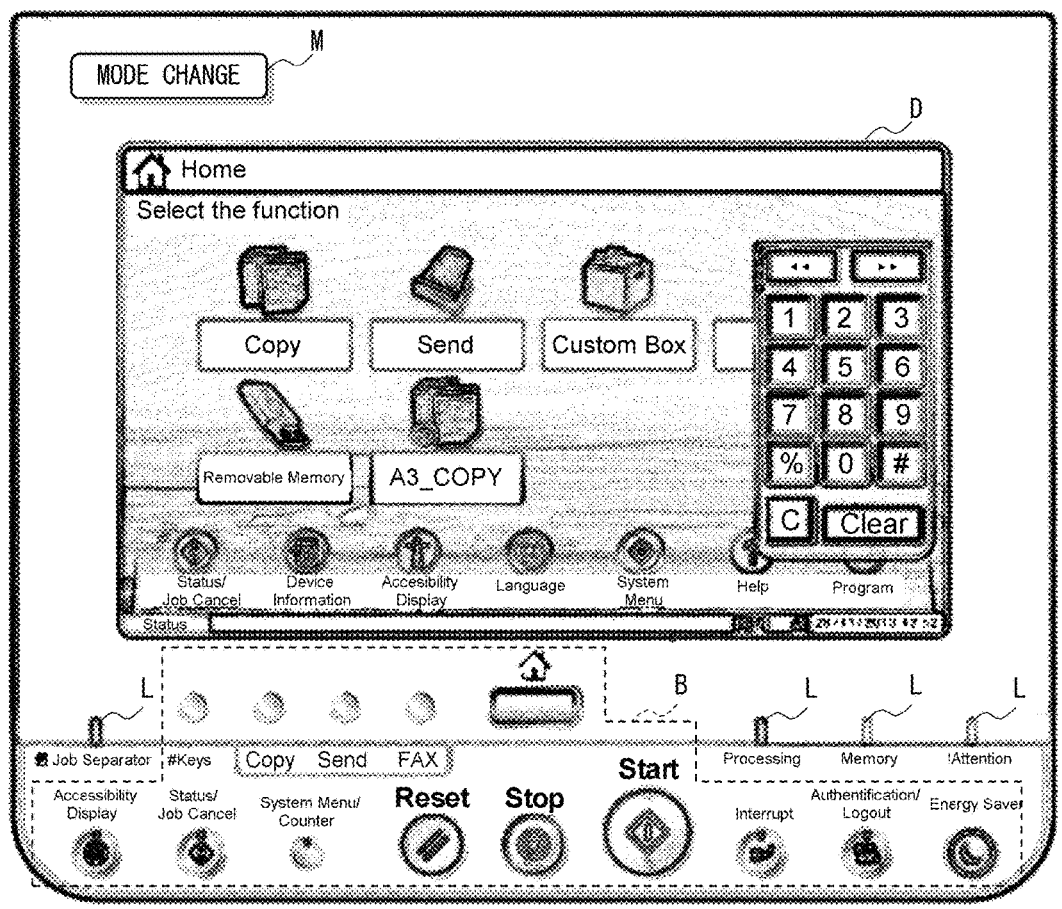
FIG. 5 shows a screen example of the emulated image shown in FIG. 4.

Here, as refer to FIG. 5, a screen example of emulated image 410 is explained. Emulated image 410 in the present embodiment includes, for example, panel D, which is an image of an area emulated the display panel of display part 47. Also, emulated image 410 includes button group B that shows the various buttons corresponding to input part 46 of image forming apparatus 1. That is, button group B is an image of the area emulated physical buttons, which is in the area other than the display panel of display part 47 of operation panel part 16 in image forming apparatus 1. Also, emulated image 410 includes image of indicator L, which is emulated LED, or the like. The image of these areas may be updated by operation of the support personnel. The support personnel control image forming apparatus 1 by depressing each button of panel D and button group B on emulated image 410. The control result is reflected in panel D and indicator L by using emulated image 410 acquired from image forming apparatus 1.

Also, emulated image 410 includes the image for mode change button M to change the mode outside of the area displayed in operation panel part 16. The area of the mode change button M may be on a place different from the areas of panel D, indicator L, and button group B. Also, the mode change button M may be included only in emulated image 410, and it may not be present in real operation panel part 16 in image forming apparatus 1.

In addition, mode change button M may be arranged other than the inside of emulated image 410, or may be set up with a menu, a button, or the like in a web browser. Also, a configuration that includes the equivalent instructions as depression of mode change button M in operational information 400 by depressing a key of input part 26, or the like, is also possible.

Here, control part 10 of image forming apparatus 1 functions as connecting part 100, operation acquiring part 110, drawing mode switching part 141, and drawing part 160 by executing the control program stored in memory part 19. Also, control part 20 of support terminal 2 functions as display operating part 200 and operation transmitting part 210 by executing the control program stored in memory part 29.

Also, each part of the above-mentioned image forming apparatus 1 and support terminal 2 serves as hardware resources to execute the communication processing method in the present disclosure. In addition, the above-mentioned part or arbitrary combination of a functional configuration may be configured as in hardware with an IC, a programmable logic, FPGA (Field Programmable Gate Array), or the like.

[Drawing Support Process in Image Forming System X]

Figure 6:
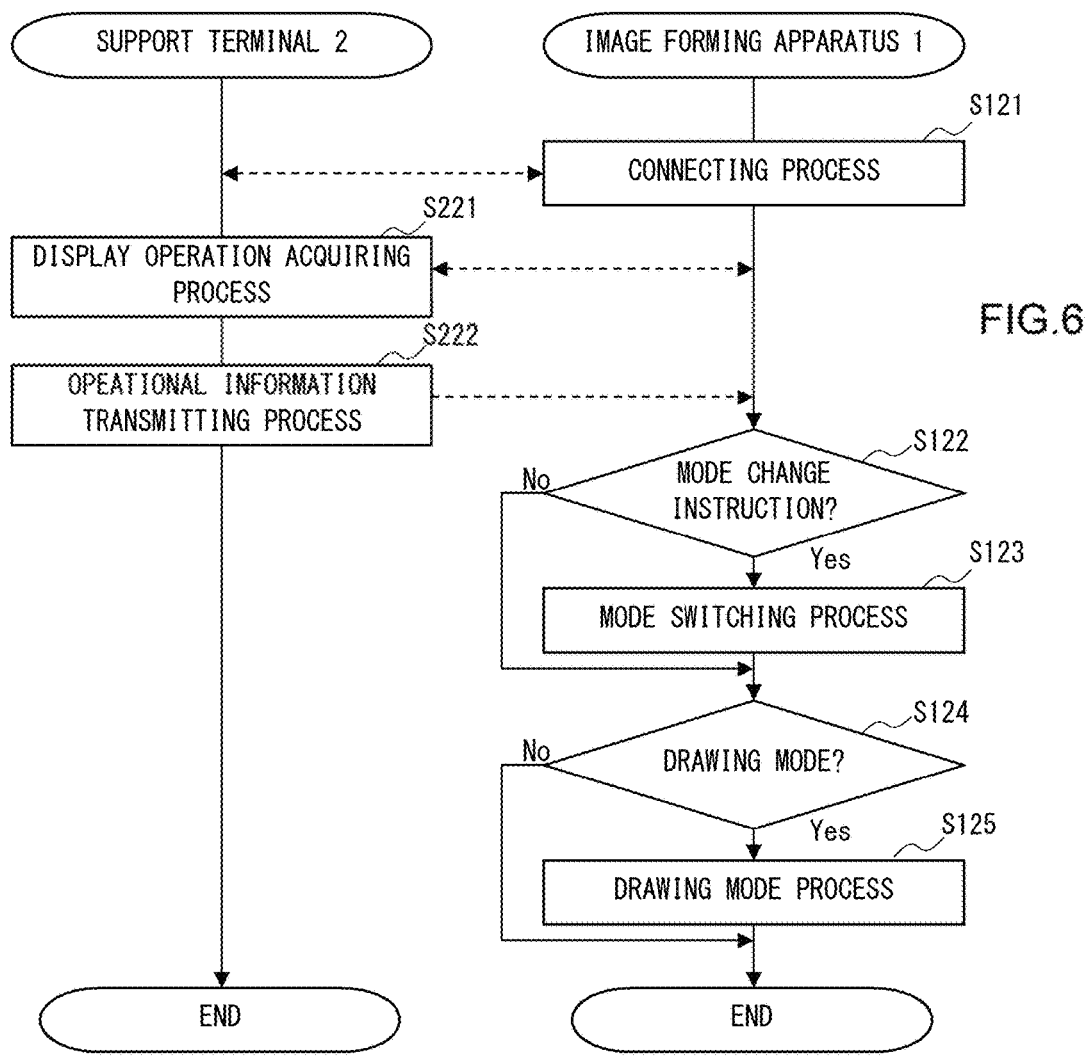
FIG. 6 is a flow chart of a drawing support process according to the embodiment of the present disclosure.
Figure 7:
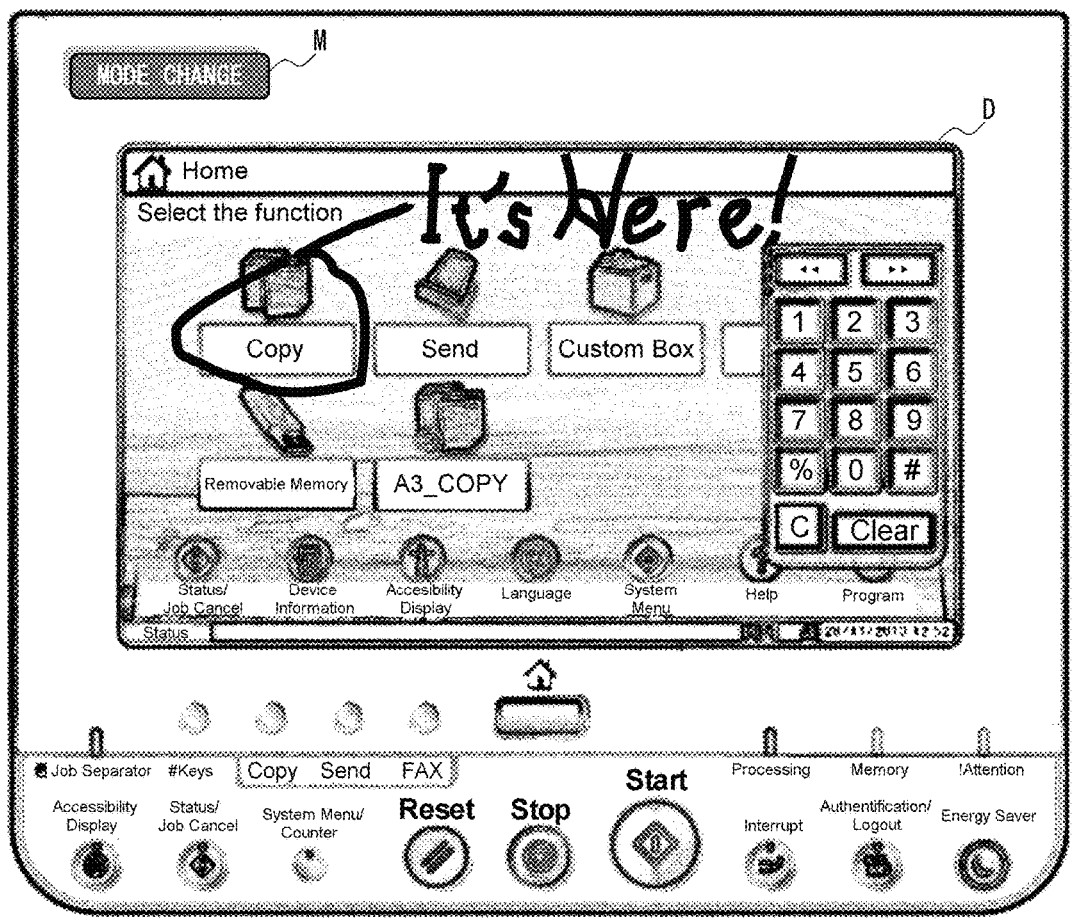
FIG. 7 is an example of the emulated image drawn by the drawing support process as shown in FIG. 6.

Then, as refer to FIG. 6-FIG. 7, a drawing support process in image forming system X according to the embodiment of the present disclosure is explained. In the drawing support process of the present embodiment, control part 10 of image forming apparatus 1 executes the control program stored in memory part 19, control part 20 of support terminal 2 executes the control program stored in memory part 29 with collaborating each part and by using hardware resources. In the following, with reference to the flow chart in FIG. 6, the details of a drawing support process are explained for each step.

(Step S121)

Firstly, connecting part 100 of image forming apparatus 1 performs a connecting process. The IT administrator, or the like, uses service of remote maintenance in time of problem solving or training of image forming apparatus 1, or the like.

In this case, IT administrator, or the like, may also possibly receive and answer by voice message, directly, with the support personnel in the support terminal 2 by using a voice line, or the like, connected with the image forming apparatus 1. The support personnel may communicate that starting remote maintenance by using the remote panel function of image forming apparatus 1 is desired. Then, IT administrator, or the like, instructs to execute the remote panel as remote maintenance by using operation panel part 16 in image forming apparatus 1, or the like. Thereby, connecting part 100 connects with support terminal 2 in a session of the specific protocol, such as a protocol extended from the RFB protocol. In this case, connecting part 100 executes a program compatible with the RFB server.

Also, in this case, display operating part 200 in support terminal 2 acquires, for example, communication error of the session, an environment information of support terminal 2, an environment information of the self-apparatus, or the like, as log information 420, and stores it in memory part 29, temporarily.

(Step S221)

Here, display operating part 200 in support terminal 2 performs a display operation acquiring process. The support personnel of support terminal 2 starts the web browser and executes the "remote panel" that is a program compatible with the RFB client. Thereby, display operating part 200 connects with connecting part 100 in image forming apparatus 1 with the protocol extended from the RFB protocol. Thereby, emulated image 410 is displayed on the web browser, and movement, depression of the pointer, or the like, is enabled by input part 26.

(Step S222)

Then, operation transmitting part 210 performs an operational information transmitting process. Operation transmitting part 210 acquires rectangle coordinates of the pointer moved in emulated image 410 on the web browser as the pointer data. Also, operation transmitting part 210 acquires information of depression of a button or a physical key and adds it to the pointer data, too. Operation transmitting part 210 transmits the pointer data as operational information 400 to image forming apparatus 1.

(Step S122)

Then, drawing mode switching part 141 determines whether mode change instruction is inputted or not. Drawing mode switching part 141 determines Yes if the area of the image for the mode change button is depressed with the pointer in the pointer data of operational information 400. Also, drawing mode switching part 141 determines Yes if the specific key is depressed in the key data of operational information 400. Drawing mode switching part 141 determines with No if other.

In Yes, drawing mode switching part 141 advances a process to Step S123.

In No, drawing mode switching part 141 advances a process to Step S124.

(Step S123)

If there are mode change instructions, drawing mode switching part 141 performs a mode switching process. Drawing mode switching part 141 switches the state in the present mode with reference to mode information 440. That is, drawing mode switching part 141 switches to the drawing mode if the present mode is the normal control mode. Also, drawing mode switching part 141 switches to the normal control mode if the present mode is the drawing mode. Drawing mode switching part 141 is reversing the flag of mode information 440 and may perform this switching (changing).

Also, according to FIG. 7, drawing mode switching part 141 reverses the display of mode change button M, or the like, it may indicate to the support personnel that the state in the present mode has been changed. In addition, the display of button M itself may be changed to the "drawing mode" or the "normal control mode."

(Step 124)

Here, drawing part 160 determines whether the present mode is the drawing mode or not. Drawing part 160 determines Yes if mode information 440 is in the drawing mode. Drawing part 160 determines No if mode information 440 is in the normal control mode.

In Yes, drawing part 160 advances a process to Step S125.

In No, drawing part 160 ends the drawing support process.

(Step S125)

If it is in the drawing mode, drawing part 160 performs a drawing mode process. According to FIG. 7, drawing part 160 refers to drawing instruction 540 in operational information 400, and it draws to display part 47 of operation panel part 16 corresponding to the drawing instruction 540. Also, drawing part 160 reflects the result of drawing to display part 47 on emulated image 410. In the example of FIG. 7, the support personnel indicate an icon and a physical button of "Copy."

In this example, only the area of the display panel of display part 47 corresponding to the area of "panel D" in emulated image 410 is displayed on image forming apparatus 1. Also, emulated image 410 itself is transmitted to support terminal 2 by the above-mentioned display operation acquiring process. As a result, the drawing result reflects on support terminal 2 by the image data transmitted by the RFB server in image forming apparatus 1. That is, drawing is executed with image forming apparatus 1 with the pointer data and the key data included in operational information 400. Then, the result of the drawing is displayed also on display part 27 in support terminal 2. As the above-mentioned, the drawing support process according to the embodiment of the present disclosure is ended.

The following effects can be obtained with constituting as mentioned above.

In typical technology, the support personnel can't instruct according to the contents drawn on the support terminal.

On the other hand, image forming system X according to the embodiment of the present disclosure includes image forming apparatus 1 and support terminal 2 for the remote maintenance of image forming apparatus 1. Image forming apparatus 1 is provided with connecting part 100, operation acquiring part 110, drawing mode switching part 141, and drawing part 160. Connecting part 100 connects with support terminal 2 for remote maintenance in a session of a specific protocol. Operation acquiring part 110 acquires operational information 400 corresponding to operation of support terminal 2 connected by connecting part 100. Drawing mode switching part 141 switches to the drawing mode that performs drawing on a display of an operation panel by operational information 400 acquired by operation acquiring part 110. Drawing part 160, when switching to the drawing mode by drawing mode switching part 141, draws to operation panel part 16 corresponding to drawing instruction 540 included in operational information 400 and reflects a drawing result to support terminal 2. Support terminal 2 is provided with display part 27 and operation transmitting part 210. Display part 27 displays emulated image 410, which is emulated on the operation panel of image forming apparatus 1. Operation transmitting part 210 transmits operational information 400 including pointer data about movement and depression of a pointer on emulated image 410 and/or key data about depression of the key of support terminal 2 to image forming apparatus 1 in the session.

As configured in this way, the support personnel can instruct to IT administrator, or the like, according to the contents drawn on the remote panel in support terminal 2. That is, when the support personnel educate operation to IT administrator, or the like, input of a character, drawing of an annotation picture, drawing of a highlight, or the like by using the remote panel can be performed. Thereby, IT administrator, or the like, can be helped to understand, and it can be contributed to the support for remote maintenance.

Also, since image forming apparatus 1 in image forming system. X of the present embodiment draws based on operational information 400 from support terminal 2, transmission of the image data of the drawing from support terminal 2, or the like becomes unnecessary. Thereby, the loading of support terminal 2, or the like, can be reduced. Also, the contents of the drawing in emulated image 410 can be the same between support terminal 2 and image forming apparatus 1, and thus trouble, or the like, by inconsistency of the drawing can be avoided.

Also, in image forming apparatus 1 according to the embodiment of the present disclosure, drawing part 160 performs input of a character, drawing of an annotation picture, or drawing of a highlight in the drawing mode.

As configured in this way, about the support for remote maintenance, input of the character, drawing of an annotation picture, drawing of a highlight, or the like, corresponding to emulated image 410 of image forming apparatus 1 can be performed via image forming apparatus 1. That is, it becomes possible to perform drawing, or the like, from the remote panel coincided with internal data by using function in image forming apparatus 1. Thereby, a character, or the like, can be inputted, certainly, Also, the contents of a highlight, or the like, can be combined with an area of characters, such as a document file, a position of an icon, or the like, certainly. Therefore, a support as intended by the support personnel can be provided.

Also, in image forming apparatus 1 according to the embodiment of the present disclosure, a specific protocol is a protocol that extends from the RFB protocol. Also, operational information 400 includes pointer data about movement and depression of a pointer on emulated image 410, which is emulated on operation panel part 16 in the self-apparatus and is displayed on support terminal 2. Also, operational information 400 includes key data about depression of a key of support terminal 2. Also, drawing instruction 540 corresponds to the pointer data and/or the key data.

As configured in this way, from the remote panel, information about movement of the pointer and depression of the key defined by the RFB protocol can be transmitted as operational information 400, and the drawing mode can be performed. That is, drawing in image forming apparatus 1 can be performed by the protocol extending from the RFB protocol. Thereby, a development cost can be reduced. Also, because a plurality of sessions in the remote panel becomes unnecessary, a problem for connection by opening and closing of a port, or the like, will not be occurred.

Also, it becomes unnecessary to transmit the actually-drawn image itself from support terminal 2. Thereby, the loading of support terminal 2 is reducible.

Also, in image forming apparatus 1 according to the embodiment of the present disclosure, emulated image 410 includes an image for a mode change button that changes the mode in an area other than an area where displaying is performed by operation panel part 16 of a self-apparatus. Also, drawing mode switching part 141 changes the mode when the area of the image for the mode change button is depressed with a pointer in operational information 400 or when a specific key of support terminal 2 is depressed.

As configured in this way, only the support personnel can draw. Therefore, an operational mistake by IT administrator, or the like, in image forming apparatus 1 is prevented, and the efficiency of remote maintenance can be attained.

OTHER EMBODIMENTS

In the above-mentioned embodiment, an example that executes the remote panel with the RFB protocol is explained. However, a remote panel may be performed with other original protocols, and the above-mentioned remote maintenance may be performed. Also, in an above-mentioned embodiment, an example that a program corresponding to an RFB client is executed on a web browser in support terminal 2 to perform the remote panel is explained. However, in support terminal 2, a dedicated application may be installed, and a remote panel may be performed. For example, emulated image 410 may be generated in image forming apparatus 1, without using VNC, or the like, the image may be pushed to the web browser or the dedicated application, serially, or streaming may be performed in support terminal 2. Also, contrary, in support terminal 2, an operation display program that generates emulated image 410 of image forming apparatus 1 corresponding to operation of the support personnel may be executed. In this case, by executing the operation display program, operational information 400 may be transmitted as well as the above-mentioned configuration, and image forming apparatus 1 may be controlled. Also, in this case, without transmitting the image data itself from image forming apparatus 1, only data required to generate emulated image 410, which is data related to a user file, or the like, may be transmitted. In addition, the operation display program may be a "real" emulator that executes the control program, which is similar program stored in memory part 19 in image forming apparatus 1, at support terminal 2. As configured in this way, a remote panel can be established even if an environment that the RFB protocol is unusable, for example, environment connectable only with the port of HTTP, or the like. Also, it is also possible to configure so as to compress the bandwidth of data related to transmission and reception of data.

In the above embodiment, an example that the mode change button is arranged within emulated image 410 is explained. However, the mode change button may be arranged other than the inside of emulated image 410, or may be set up with a menu, a button, or the like, on the web browser. Also, a configuration that includes the instruction similar to depression of mode change button M in operational information 400 by depression of the key of input part 26, or the like, is also possible.

Also, in the above-mentioned embodiment, it is mainly-disclosed an example that operation by the support personnel is reflected in displaying or controlling to image forming apparatus 1. However, the operation by IT administrator, or the like, to operation panel part 16 in image forming apparatus 1 may be reflected in controlling of emulated image 410 or image forming apparatus 1. Also, it is possible to configure that the reflected result may be transmitted to support terminal 2. Thereby, in addition to instruction and operation by the support personnel, corresponding to actual operation by IT administrator, emulated image 410 can be generated, or image forming apparatus 1 can be controlled. This can help IT administrator in training, or the like, understand well.

In the above-mentioned embodiment, an example that arranges the mode change button in the position displayed only on display part 27 in support terminal 2 is shown. However, the button for drawing mode may be arranged on input part 46 of operation panel part 16 in image forming apparatus 1. The button in the drawing mode may be drawn on a display panel, or may be provided as a physical key.

As configured in this way, contents that IT administrator, or the like, draws on operation panel part 16 in image forming apparatus 1 can be reflected on support terminal 2. Also, controlling image forming apparatus 1 by input of hand writing, or the like, can be performed.

Further, this mode change button in image forming apparatus 1 may be arranged other than the mode change button in emulated image 410 as above-mentioned, and each button may have different specification. That is, the type of character, the color of drawing, the contents of the highlight, or the like, may be changed whether the input is performed by support personnel, IT administrator, or the like.

As configured in this way, an educational effect will be increased.

Also, the present disclosure is applicable to information processing apparatus other than the image forming apparatus. That is, it may be configured to use the network scanner, a server, or the like, which separately-connected with a scanner by USB, or the like.

Also, the configuration and operation of the above-mentioned embodiment are an example, and it cannot be over-emphasized that it can change suitably and can execute in the range that does not deviate from the aim of the present disclosure.

What is claimed is:
1. An image forming apparatus comprising:
a connecting part configured to connect with a terminal for remote maintenance in a session of a specific protocol;
an operation acquiring part configured to acquire operational information corresponding to operation of the terminal connected by the connecting part;
a drawing mode switching part configured to switch to a drawing mode that performs drawing on a display of an operation panel part of a self-apparatus of the image forming apparatus by the operational information acquired by the operation acquiring part; and
a drawing part configured to draw to the operation panel part corresponding to a drawing instruction included in the operational information and to reflect a drawing result on the terminal when being switched to the drawing mode by the drawing mode switching part,
wherein
the specific protocol is a protocol that extends from a remote frame buffer (RFB) protocol;
the operational information includes a) pointer data about movement and depression of a pointer on an emulated image emulated based on the operation panel part of the self-apparatus, and displayed on the terminal and/or b) key data about depression of a key in the terminal;
the drawing instruction corresponds to the pointer data and/or the key data;
the emulated image includes an image for a mode change button changing the mode in an area other than an area displayed in the operation panel part of the self-apparatus; and the drawing mode switching part changes the mode when the area of the image for the mode change button is depressed with the pointer or a specific key of the terminal is depressed in the operational information.

2. The image forming apparatus according to claim 1, wherein
the drawing part performs an input of a character, drawing of an annotation picture, or drawing of a highlight in the drawing mode.

3. An image forming system having an image forming apparatus and a terminal for remote maintenance of the image forming apparatus, wherein:
the image forming apparatus includes
a connecting part configured to connects with the terminal in a session of a specific protocol;
an operation acquiring part configured to acquire operational information corresponding to operation of the terminal connected by the connecting part;
a drawing mode switching part configured to switch to a drawing mode that performs drawing on a display of an operation panel part of a self-apparatus of the image forming apparatus by the operational information acquired by the operation acquiring part; and
a drawing part configured to draw to the operation panel part corresponding to a drawing instruction included in the operational information and to reflect a drawing result on the terminal when being switched to the drawing mode by the drawing mode switching part; and
the terminal includes
a display part configured to display an emulated image emulated based on the operation panel part of the self-apparatus of the image forming apparatus; and
an operation transmitting part configured to transmit the operational information, wherein the operational information includes a) pointer data about movement and depression of a pointer on the emulated image and/or b) key data about depression of a key in the terminal to the image forming apparatus in the session;
the specific protocol is a protocol that extends from a remote frame buffer (RFB) protocol;
the drawing instruction corresponds to the pointer data and/or the key data;
the emulated image includes an image for a mode change button changing the mode in an area other than an area displayed in the operation panel part of the self-apparatus; and
the drawing mode switching part changes the mode when the area of the image for the mode change button is depressed with the pointer or a specific key of the terminal is depressed in the operational information.

4. The image forming system according to claim 3, wherein
the drawing part performs an input of a character, drawing of an annotation picture, or drawing of a highlight in the drawing mode.

5. A communication processing method executed by an image forming apparatus capable of communicating with a terminal for remote maintenance, comprising the steps of:
connecting with the terminal in a session of a specific protocol;
acquiring operational information corresponding to operation of the connected terminal;
switching to a drawing mode that performs drawing on a display of an operation panel part of a self-apparatus of the image forming apparatus by the acquired operational information;
drawing to the operation panel part corresponding to a drawing instruction included in the operational information; and
reflecting a drawing result on the terminal when being switched to the drawing mode,
wherein
the specific protocol is a protocol that extends from a remote frame buffer (RFB) protocol;
the operational information includes: a) pointer data about movement and depression of a pointer on an emulated image emulated based on the operation panel part of the self-apparatus, and displayed on the terminal and/or b) key data about depression of a key of the terminal;
the drawing instruction corresponds to the pointer data and/or the key data;
the emulated image includes an image for a mode change button changing the mode in an area other than an area displayed in the operation panel part of the self-apparatus; and
the method comprises changing the mode when the area of the image for the mode change button is depressed with the pointer or a specific key of the terminal is depressed in the operational information.

6. The communication processing method according to claim 5, comprising
performing, in the drawing mode, an input of a character, drawing of an annotation picture, or drawing of a highlight.

* * * * *